United States Patent
Jun et al.

(10) Patent No.: US 11,724,684 B2
(45) Date of Patent: Aug. 15, 2023

(54) APPARATUS AND METHOD FOR CONTROLLING VEHICLE UTILIZING TRAFFIC INFORMATION

(71) Applicant: HYUNDAI KEFICO CORPORATION, Gyeonggi-do (KR)

(72) Inventors: Young-Ho Jun, Seoul (KR); Hyun-Ki Shin, Gangwon-do (KR); Hyung-Jin Shin, Seoul (KR); Jun-Hyung Lee, Gyeonggi-do (KR); Jung-Mook Choo, Seoul (KR)

(73) Assignee: Hyundai Kefico Corporation, Gunpo (KR)

( * ) Notice: Subject to any disclaimer, the term of this patent is extended or adjusted under 35 U.S.C. 154(b) by 77 days.

(21) Appl. No.: 17/386,986

(22) Filed: Jul. 28, 2021

(65) Prior Publication Data
US 2022/0032899 A1    Feb. 3, 2022

(30) Foreign Application Priority Data
Jul. 28, 2020   (KR) .......................... 10-2020-0093875

(51) Int. Cl.
*B60W 20/12*        (2016.01)
*B60W 10/06*        (2006.01)
(Continued)

(52) U.S. Cl.
CPC ............... *B60W 20/12* (2016.01); *B60K 6/48* (2013.01); *B60W 10/06* (2013.01); *B60W 10/08* (2013.01);
(Continued)

(58) Field of Classification Search
CPC ...... B60W 20/12; B60W 10/06; B60W 10/08; B60W 10/26; B60W 2510/244;
(Continued)

(56) References Cited

U.S. PATENT DOCUMENTS

2011/0087390 A1*   4/2011   Pandit ................... B60W 20/14
                                                             903/903
2016/0167642 A1*   6/2016   Debert ................... B60W 10/26
                                                             180/65.265
(Continued)

FOREIGN PATENT DOCUMENTS

KR        101448921 B1    10/2014
KR       2017-0016706 A    2/2017
KR       2017-0070629 A    6/2017

*Primary Examiner* — Carl C Staubach
(74) *Attorney, Agent, or Firm* — Fox Rothschild LLP

(57) ABSTRACT

A control apparatus for controlling a vehicle includes a driving motor configured to drive the vehicle by outputting motor torque based on a supply voltage from a battery, and an engine configured to drive the vehicle by outputting engine torque. The control apparatus may acquire driving mode data which is calculated based on traffic information from the current position to the destination of the vehicle and dimension information of the vehicle, and control the vehicle to drive to the destination according to a driving mode which is determined by applying a travelling condition of the vehicle to the acquired driving mode data, where the power distribution ratio of the motor torque to the engine torque is reflected in the driving mode data.

11 Claims, 5 Drawing Sheets

(51) Int. Cl.
*B60W 10/08* (2006.01)
*B60K 6/48* (2007.10)
*B60W 10/26* (2006.01)

(52) U.S. Cl.
CPC ....... *B60W 10/26* (2013.01); *B60W 2510/244* (2013.01); *B60W 2554/408* (2020.02); *B60W 2710/0677* (2013.01); *B60W 2710/086* (2013.01); *B60W 2720/30* (2013.01)

(58) Field of Classification Search
CPC ... B60W 2554/408; B60W 2710/0677; B60W 2710/086; B60W 2720/30
See application file for complete search history.

(56) References Cited

U.S. PATENT DOCUMENTS

| | | | |
|---|---|---|---|
| 2017/0120890 A1* | 5/2017 | Payne | G08G 1/096833 |
| 2019/0270443 A1* | 9/2019 | Kurihashi | B60W 20/12 |
| 2020/0207378 A1* | 7/2020 | Lavertu | B61C 17/00 |
| 2020/0216067 A1* | 7/2020 | Olin | B60W 20/15 |
| 2021/0009128 A1* | 1/2021 | Jokela | B60W 30/18163 |
| 2021/0253079 A1* | 8/2021 | Eto | B60W 10/06 |
| 2021/0370907 A1* | 12/2021 | Huang | B60L 50/13 |

\* cited by examiner

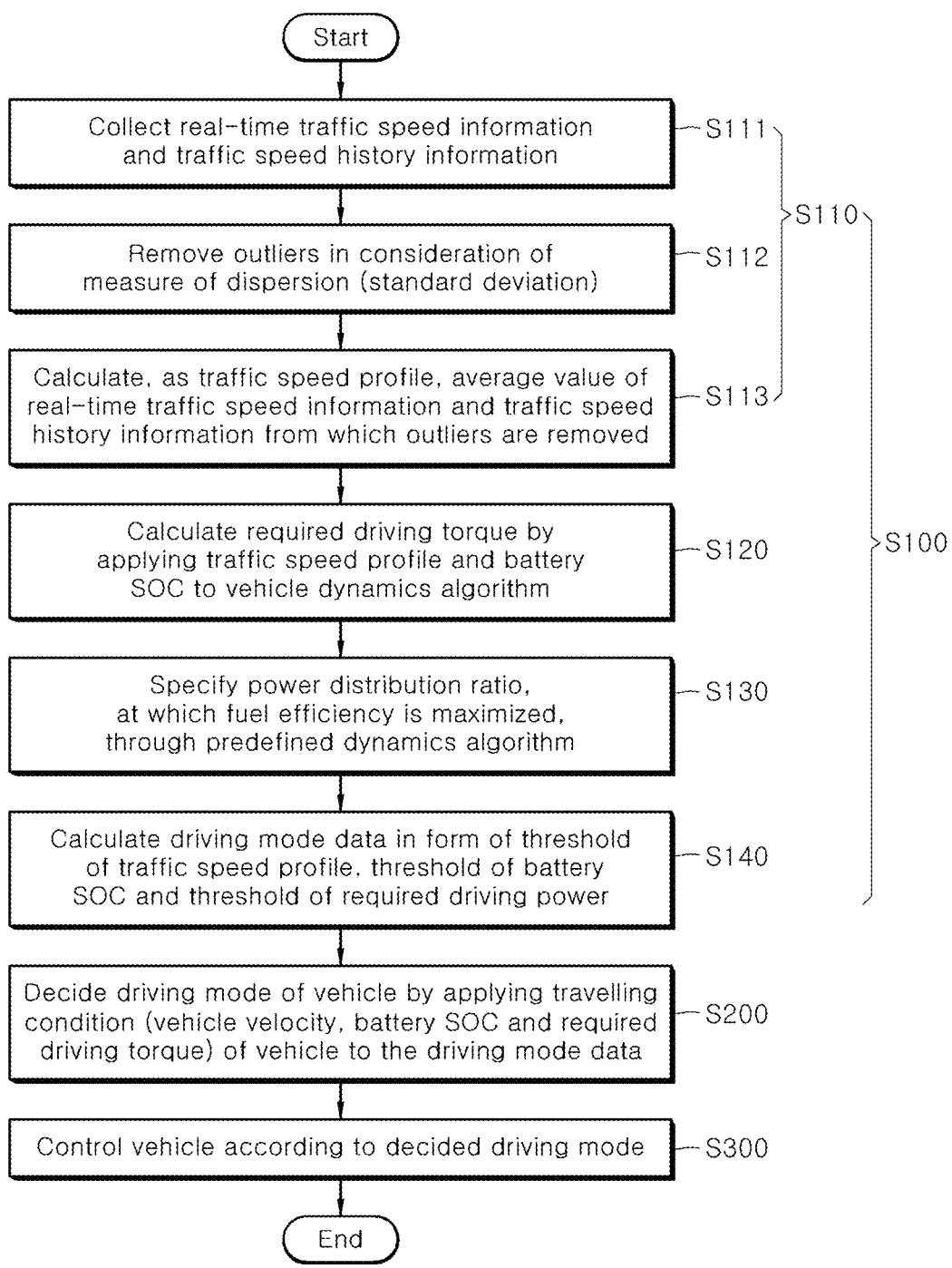

APPARATUS AND METHOD FOR CONTROLLING VEHICLE UTILIZING TRAFFIC INFORMATION

CROSS-REFERENCE TO RELATED APPLICATION

This application claims under 35 U.S.C. § 119(a) the benefit of Korean Patent Application No. 10-2020-0093875, filed on Jul. 28, 2020, the entire contents of which are incorporated by reference herein.

BACKGROUND a) Technical Field

Exemplary embodiments of the present disclosure relate to an apparatus and method for controlling a vehicle, more particularly, to the apparatus and method for controlling a hybrid vehicle.

(b) Description of the Related Art

Eco-friendly vehicles such as an HEV (Hybrid Electric Vehicle) or PHEV (Plug-In Hybrid Electric Vehicle) use a plurality of power sources to drive a vehicle, and examples of the power sources include a gasoline or diesel engine and a driving motor (motor/generator). The gasoline or diesel engine uses existing fossil fuel(s), and the driving motor (motor/generator) is driven by electric energy supplied from a battery of the vehicle. Such a hybrid vehicle includes an OBC (On-Board Charger) for charging the battery, and the OBC includes heavy parts such as a high voltage switch, inductor, capacitor, isolated transformer, relay, control board and cooling system. Since such heavy parts increase the weight of the hybrid vehicle and decrease fuel efficiency, it is important to establish a driving control strategy for improving the fuel efficiency of the hybrid vehicle.

Such a hybrid vehicle is designed to operate in an electric vehicle (EV) mode, an HEV mode or a regenerative braking mode, according to a combination of an engine and a driving motor. In the EV mode, the driving motor is solely driven. In the HEV mode, the engine and the driving motor are simultaneously driven. In the regenerative braking mode, the inertial force of the vehicle which intends to go straight during vehicle braking is absorbed by the driving motor to brake the vehicle, and energy generated by a counter electromotive force formed in the driving motor is stored in the battery. In the conventional hybrid vehicle, the driving mode is switched through a method that uses fixed reference values which are defined when the vehicle is designed or a manual method in which a driver directly sets a driving mode (CS (Charge Sustaining) mode or CD (Charge Depletion) mode through a button operation. Thus, since there is a limitation in that the driving mode of the hybrid vehicle cannot be optimized for a route to a destination, the fuel efficiency is reduced.

The related art includes Korean Patent Application Laid-Open No. 10-2017-0070629 published on Jun. 22, 2017.

SUMMARY

Various embodiments are directed to an apparatus and method for controlling a hybrid vehicle, which can actively determine a driving mode of the hybrid vehicle based on route information to a destination and a travelling condition of the vehicle, and control the vehicle to drive to the destination, thereby improving fuel efficiency.

In an embodiment, there is provided an apparatus for controlling a vehicle which includes a driving motor configured to drive the vehicle by outputting motor torque based on a supply voltage from a battery, and an engine configured to drive the vehicle by outputting engine torque. The control apparatus may acquire driving mode data which is calculated based on traffic information from the current position to the destination of the vehicle and dimension information of the vehicle, and control the vehicle to drive to the destination according to a driving mode which is determined by applying a travelling condition of the vehicle to the acquired driving mode data, wherein the power distribution ratio of the motor torque to the engine torque is reflected in the driving mode data.

In an embodiment, there is an apparatus for controlling a vehicle which includes a driving motor configured to drive the vehicle by outputting motor torque based on a supply voltage from a battery, and an engine configured to drive the vehicle by outputting engine torque. The apparatus may include: a driving mode data calculation unit configured to calculate driving mode data into which the power distribution ratio of the motor torque to the engine torque is reflected, based on traffic information from the current position to the destination of the vehicle and dimension information of the vehicle; and a driving control unit configured to control the vehicle to drive to the destination according to a driving mode which is determined by applying a travelling condition of the vehicle to the driving mode data calculated by the driving mode data calculation unit.

The driving mode data calculation unit may calculate a traffic speed profile as the traffic information by statistically analyzing the traffic speed from the current position to the destination of the vehicle, calculate required driving torque of the vehicle, which is required for securing the traffic speed profile, by applying a predefined vehicle dynamics algorithm to the calculated traffic speed profile, and calculate the driving mode data using a method of calculating the power distribution ratio capable of satisfying the calculated required driving torque.

The driving mode data calculation unit may collect real-time traffic speed information at a current point of time and traffic speed history information at a past point of time corresponding to the current point of time, for a route from the current position to the destination of the vehicle, remove outliers as a measure of dispersion of the collected real-time traffic speed information and traffic speed history information, and then calculate, as the traffic speed profile, an average value of the real-time traffic speed information and traffic speed history information from which the outliers are removed.

The driving mode data calculation unit may calculate the required driving torque by applying the traffic speed profile and a battery SOC (State of Charge) to the vehicle dynamics algorithm, and calculate the driving mode data using a method of specifying the power distribution ratio at which fuel efficiency is maximized, among a plurality of power distribution ratios capable of satisfying the calculated required driving torque, through a predefined dynamic algorithm.

The vehicle dynamics algorithm may be an algorithm based on a longitudinal vehicle dynamics backward model, and the dynamic algorithm may be an algorithm based on dynamic programming.

The driving mode data may be calculated as a threshold of the traffic speed profile, a threshold of the battery SOC, and a threshold of the required driving power, which serve as reference values at which the driving mode of the vehicle is switched.

The driving control unit may control the vehicle according to a driving mode which is determined by applying the velocity of the vehicle, the battery SOC, and required driving torque requested by a driver, as the travelling condition of the vehicle, to the driving mode data.

The vehicle may be a plug-in hybrid vehicle, and the driving mode of the vehicle may include an EV mode in which only the driving motor is solely driven and an HEV mode in which the driving motor and the engine are simultaneously driven.

In an embodiment, there is a method for controlling a vehicle which includes a driving motor configured to drive the vehicle by outputting motor torque based on a supply voltage from a battery, and an engine configured to drive the vehicle by outputting engine torque. The method may include: acquiring, by a driving control unit, driving mode data which is calculated based on traffic information from the current position to the destination of the vehicle and dimension information of the vehicle, wherein the power distribution ratio of the motor torque to the engine torque is reflected in the driving mode data; deciding, by the driving control unit, a driving mode of the vehicle by applying a travelling condition of the vehicle to the acquired driving mode data; and controlling, by the driving control unit, the vehicle to be driven to the destination according to the determined driving mode.

According to the embodiments of the present disclosure, the apparatus and method may calculate the driving mode data into which the power distribution ratio of the motor torque of the driving motor and the engine torque of the engine is reflected, based on the traffic information to the destination, and actively determine the driving mode of a hybrid vehicle by applying a travelling condition of the vehicle to the calculated driving mode data, in order to control the vehicle. Therefore, the driving mode of the vehicle may be optimized for the current travelling condition, which makes it possible to maximize the fuel efficiency.

BRIEF DESCRIPTION OF THE DRAWINGS

FIGS. 4 and 5 are flowcharts for describing a method for controlling a vehicle (hereafter, referred to as a vehicle control method) in accordance with an embodiment of the present disclosure.

DETAILED DESCRIPTION OF THE ILLUSTRATED EMBODIMENTS

Figure 1:
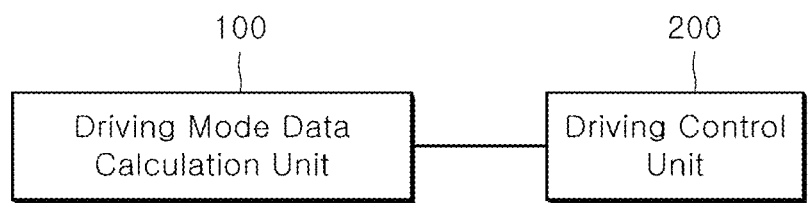
FIG. 1 is a block configuration diagram for describing an apparatus for controlling a vehicle (hereafter, referred to as a vehicle control apparatus) in accordance with an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an apparatus and method for controlling a vehicle (hereafter, referred to as a vehicle control apparatus and method) will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

A vehicle in accordance with an embodiment of the present disclosure may correspond to an HEV (Hybrid Electric Vehicle) or PHEV (Plug-In Hybrid Electric Vehicle) which includes a driving motor and an engine (e.g., gasoline engine or diesel engine). The driving motor may drive the vehicle by outputting motor torque based on a supply voltage from a battery, and the engine may drive the vehicle by outputting engine torque. A vehicle control apparatus in accordance with an embodiment of the present disclosure may acquire driving mode data which is calculated based on traffic information from the current position to the destination of a vehicle and dimension information of the vehicle, and control the vehicle to drive to the destination according to a driving mode determined by applying a travelling condition of the vehicle to the driving mode data. Here, the power distribution ratio of the motor torque to the engine torque may be reflected in the driving mode data.

As illustrated in FIG. 1, a configuration of a vehicle control apparatus in accordance with the present embodiment may be functionally divided into a driving mode data calculation unit 100 and a driving control unit 200. The driving mode data calculation unit 100 may be implemented as an external cloud server (e.g., traffic control server or navigation sever) which is provided separately from the vehicle, and the driving control unit 200 may be implemented as an electronic controller unit (ECU) which is installed in the vehicle so as to control the driving of the vehicle. Therefore, the vehicle control apparatus in accordance with the present embodiment may be implemented as a structure for communication between the driving mode data calculation unit 100 implemented as the external cloud server and the driving control unit 200 implemented as the ECU of the vehicle. For example, when a driver inputs a destination to a navigation system installed in the vehicle, the a current position of the vehicle and an input destination may be transmitted to the driving mode data calculation unit 100, and the driving mode data calculation unit 100 may calculate driving mode data based on traffic information on the route from the current position to the destination of the vehicle and previously stored dimension information of the vehicle, and transmit the calculated driving mode data to the driving control unit 200 installed in the vehicle. The calculation process will be described below. Thus, the driving control unit 200 may determine the driving mode of the vehicle using the driving mode data transmitted from the driving mode data calculation unit 100, thereby controlling the vehicle to be driven to the destination.

Hereafter, the configuration of the vehicle control apparatus in accordance with the present embodiment will be described in detail with reference to FIGS. 1 to 3.

Figure 2:
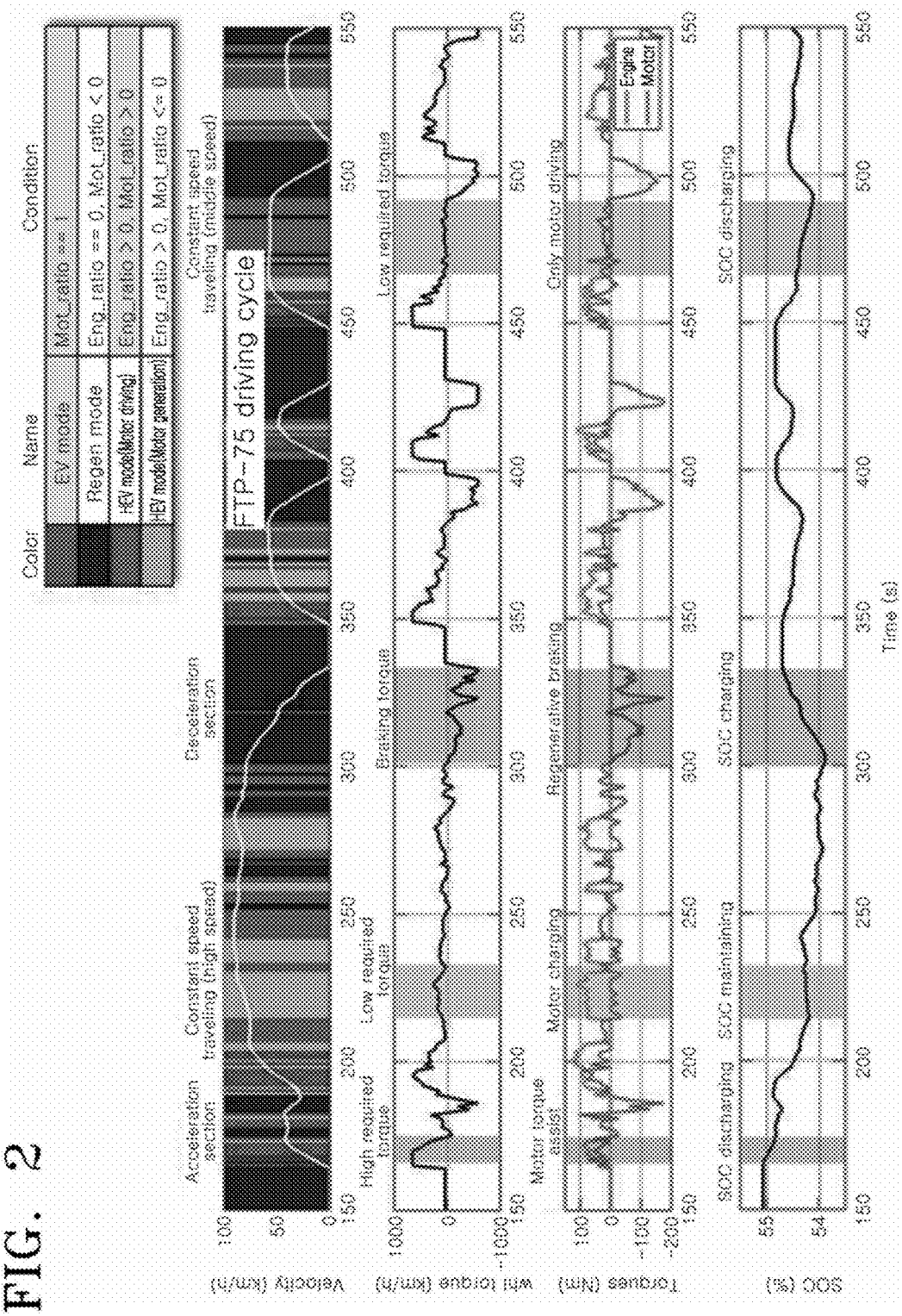
FIG. 2 is a table and graph showing a process of calculating motor torque and engine torque according to a longitudinal vehicle dynamics backward model and dynamic programming in the vehicle control apparatus in accordance with the embodiment of the present disclosure.
Figure 3:
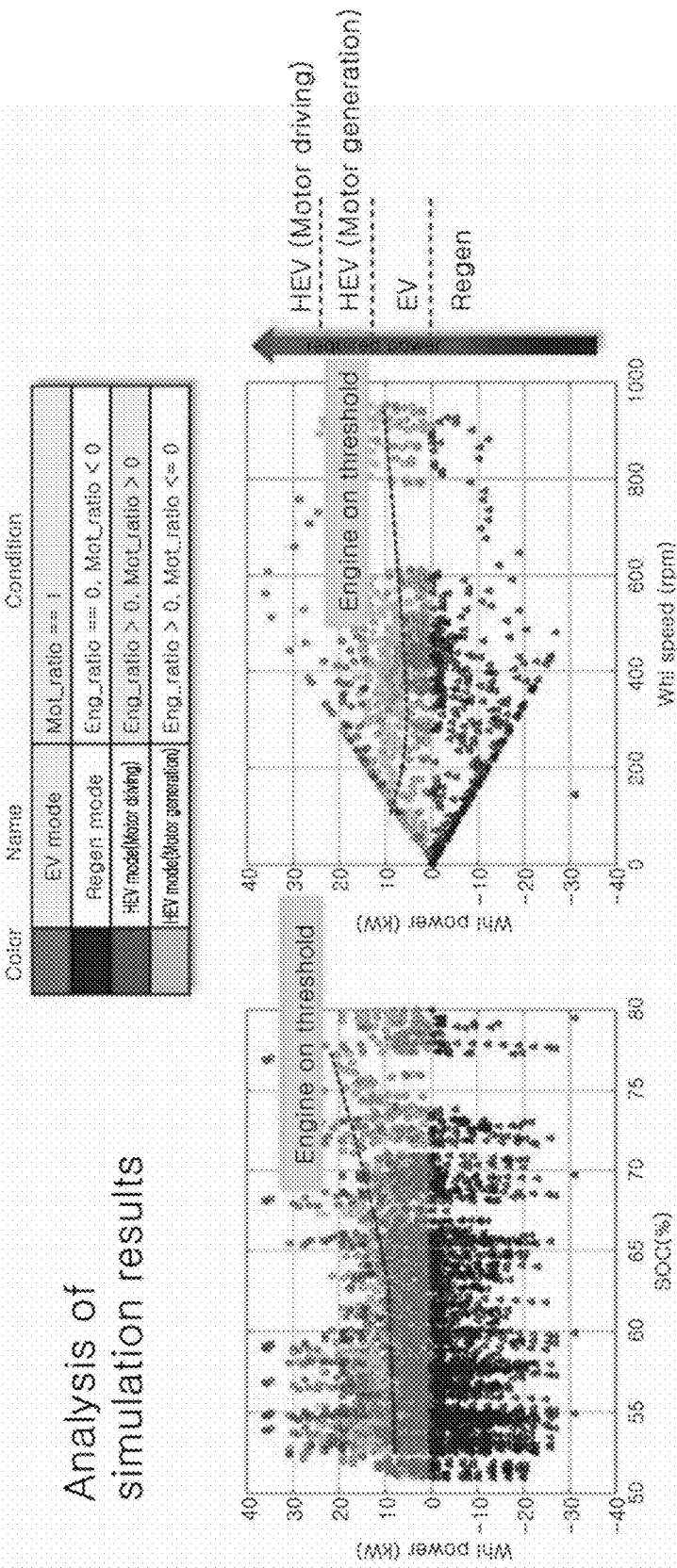
FIG. 3 is a table and graph showing a process of calculating driving mode data in the vehicle control apparatus in accordance with the embodiment of the present disclosure.

FIG. 1 is a block configuration diagram for describing a vehicle control apparatus in accordance with an embodiment of the present disclosure, FIG. 2 is a table and graph showing a process of calculating motor torque and engine torque according to a longitudinal vehicle dynamics backward model and dynamic programming in the vehicle control apparatus in accordance with the embodiment of the present disclosure, and FIG. 3 is a table and graph showing a process of calculating driving mode data in the vehicle control apparatus in accordance with the embodiment of the present disclosure.

Referring to FIG. 1, the vehicle control apparatus in accordance with the embodiment of the present disclosure may include the driving mode data calculation unit 100 and the driving control unit 200.

The driving mode data calculation unit 100 may calculate driving mode data into which the power distribution ratio of motor torque to engine torque is reflected, based on traffic information from the current position to the destination of a vehicle and dimension information of the vehicle. The operation of the driving mode data calculation unit 100 may include a process of calculating a traffic speed profile as traffic information by statistically analyzing the traffic speed from the current position to the destination of the vehicle, a process of calculating required driving torque of the vehicle, which is required for securing the traffic speed profile, by applying a predefined vehicle dynamics algorithm to the calculated traffic speed profile, a process of calculating a power distribution ratio which can satisfy the calculated required driving torque, and a process of finally calculating the driving mode data.

First, the process of calculating the traffic speed profile will be described as follows. As described above, the driving mode data calculation unit 100 may calculate the traffic speed profile as the traffic information by statistically analyzing the traffic speed from the current position to the destination of the vehicle.

For this process, the driving mode data calculation unit 100 may collect real-time traffic speed information at the current point of time for the route from the current position to the destination of the vehicle (hereafter, defined as 'target route'). As described above, the driving mode data calculation unit 100 may be implemented as a cloud server, collect real-time traffic speed information in each road section, convert the collected information into big data, and store the big data as a database. Thus, the driving mode data calculation unit 100 may receive the current position of the vehicle and the destination inputted by a user, and collect real-time traffic speed information on the target route at the current point of time.

Furthermore, the driving mode data calculation unit 100 may collect traffic speed history information at a past point of time corresponding to the current point of time, with the real-time traffic speed information on the target route at the current point of time. The past point of time corresponding to the current point of time may indicate a past point of time which has the same season, date and time as the current point of time. That is, the driving mode data calculation unit 100 may extract, from the big data stored as a database, the traffic speed history information at the past point of time having the same season, date and time as the current point of time, within a predetermined past time section which has been reversely calculated from the current point of time.

For specific example, when it is assumed that the current point of time is 1 p.m. on Jan. 1, 2020 and the predetermined past time section is five years, the driving mode data calculation unit 100 may collect the real-time traffic speed information of the target route at the current point of time, and extract the traffic speed history information of the target route based on 1 p.m. on January 1, each of the years from 2015 to 2019, from the big data stored as a database, and collect the traffic speed history information.

When the real-time traffic speed information and the traffic speed history information are collected, the driving mode data calculation unit 100 may remove outliers as a measure of dispersion of the collected real-time traffic speed information and the traffic speed history information. The above-described process may correspond to, for example, a process of calculating the standard deviation a of the collected traffic speeds, determining travel velocities beyond a range of ±α*σ from an average of the travel velocities as the outliers, and removing the outliers. Here, a may be selected as various values according to a designer's intention (e.g. 3).

Furthermore, the driving mode data calculation unit 100 may calculate, as the traffic speed profile, an average value of the traffic speed history information and real-time traffic speed information from which the outliers have been removed, and the calculated traffic speed profile indicates the representative traffic speed of the target route at the current point of time.

When the traffic speed profile of the target route is calculated through the above-described process, the driving mode data calculation unit 100 may apply a predefined vehicle dynamics algorithm to the traveling speed profile, in order to calculate the required driving torque of the vehicle, which is required for securing the traffic speed profile, or control the vehicle to travel at a velocity corresponding to the traffic speed profile. The predefined vehicle dynamics algorithm may be an algorithm based on a longitudinal vehicle dynamics backward model.

That is, the driving mode data calculation unit 100 may store the dimension information of the vehicle (e.g. the weight, equivalent mass, longitudinal length, and height of the vehicle and a normal force for a wheel) in advance, and calculate the total required driving torque (i.e. the sum of the motor torque and the engine torque), which is required for the vehicle to secure/maintain the traffic speed profile, through a method of backward calculating torque of a power train (wheel-transmission-driving motor-engine) from the traffic speed profile by using the well-known longitudinal vehicle dynamics equation, based on the stored dimension information of the vehicle, the calculated traffic speed profile and a battery SOC (State of Charge). Since the backward calculation method for the longitudinal vehicle dynamics equation is well-known, the detailed descriptions thereof will be omitted herein.

After the required driving torque is calculated, the driving mode data calculation unit 100 may calculate a power distribution ratio of motor torque to engine torque, which can satisfy the calculated required driving torque. At this time, the driving mode data calculation unit 100 may calculate the driving mode data by specifying the power distribution ratio at which the fuel efficiency is maximized or the fuel consumption is minimized, among all power distribution ratios capable of satisfying the required driving torque, through a predefined dynamic algorithm. The predefined dynamic algorithm may be an algorithm based on dynamic programming.

As well known, the dynamic programming indicates an analysis technique that divides a complex system into a plurality of sub systems, derives values by examining all methods for solving a problem, and acquires the optimal solution to the entire system by coupling the derived values. Thus, the driving mode data calculation unit 100 may specify the power distribution ratio at which the fuel efficiency is maximized or the fuel consumption is minimized, among the power distribution ratios capable of satisfying the required driving torque, through the dynamic programming. In this case, an algorithm for calculating the fuel consumption may be predefined in the driving mode data calculation unit 100. Since the dynamic programming is applied according to a well-known method, the detailed descriptions thereof will be omitted herein.

FIG. 2 illustrates a simulation result in which motor torque and engine torque were calculated according to the longitudinal vehicle dynamics backward model and the dynamic programming. In FIG. 2, Velocity represents the traffic speed profile, Wh1 torque represents the required driving torque, Torques represents the motor torque and the engine torque, and SOC represents the battery SOC. As the traffic speed profile, a driving cycle predefined by a designer (e.g. FTP-75 driving cycle) was employed. Furthermore, Mot_ratio and Eng_ratio are used as symbols which represent the ratio of the motor torque and the ratio of engine torque, respectively, Mot_ratio has a value of −1 to 1, and Eng_ratio has a value of 0 to 1. The case of −1<Mot_ratio<0 indicates that the driving motor generates power, the case of 0<Mot_ratio<1 indicates that the driving motor is driven, and the case of Mot_ratio=1 indicates that the driving motor is solely driven. The case of 0<Eng_ratio<1 indicates that the engine is driven, and the case of Eng_ratio=1 indicates that the engine is solely driven. Thus, the driving mode of the vehicle in the present embodiment may include the EV mode in which the driving motor is solely driven, and the HEV mode in which the driving motor and the engine are simultaneously driven. At this time, it is defined that the HEV mode includes the mode in which the motor generates power. Furthermore, as illustrated in FIG. 2, the driving mode may further include the regenerative braking mode Regen mode.

The factors which are considered during the process of specifying the power distribution ratio of motor torque to engine torque through the above-described process are the traffic speed profile, the battery SOC and the required driving torque. Thus, the driving mode data in the present embodiment may be calculated as a threshold of the traffic speed profile, a threshold of the battery SOC and a threshold of the required driving power, which serve as reference values at which the driving mode of the vehicle is switched.

FIG. 3 illustrates results obtained by classifying the driving mode of the vehicle according to the battery SOC, the traffic speed profile and the required driving power. In FIG. 3, Wh1 speed corresponds to the traffic speed profile, and Wh1 power corresponds to the required driving power. Referring to the left graph of FIG. 3, the driving mode may be classified according to the power distribution ratio, with the battery SOC and the required driving power set to the X-axis and the Y-axis, respectively. In this case, the boundary where the driving mode is switched from the EV mode to the HEV mode may be derived through interpolation or regression analysis. Similarly, referring to the right graph of FIG. 3, the driving mode may be classified according to the power distribution ratio, with the traffic speed profile and the required driving power set to the X-axis and the Y-axis, respectively. In this case, the boundary where the driving mode is switched from the EV mode to the HEV mode may be derived through the interpolation or regression analysis. In FIG. 3, only the boundary where the driving mode is switched from the EV mode to the HEV mode is represented by 'Engine on threshold', but the boundary where the driving mode is switched from the regenerative braking mode to the EV mode may also be derived together. Through the above-described process, a threshold of the traffic speed profile, a threshold of the battery SOC and a threshold of the required driving power, which serve as the reference values at which the driving mode of the vehicle is switched from the EV mode to the HEV mode or at which the driving mode is switched from the regenerative braking mode to the EV mode, may be calculated as the driving mode data.

When the driving mode data calculated through the above-described process is transferred to the driving control unit 200, the driving control unit 200 may control the vehicle according to the driving mode which is determined by applying the velocity of the vehicle, the battery SOC and the required driving torque requested by the driver, as the travelling condition of the vehicle, to the driving mode data. That is, the driving control unit 200 may determine the driving mode of the vehicle by comparing the measured values of the velocity of the vehicle, the battery SOC and the required driving torque requested by the driver (e.g. required driving torque calculated based on a sensing value of a PTS (Pedal Travel Sensor)), which are acquired while the vehicle travels to the destination, to the threshold of the travel speed profile, the threshold of the battery SOC and the threshold of the required driving power in the driving mode data, and then control the vehicle according to the determined driving mode. At the initial point of time before the vehicle starts to travel, the driving mode of the vehicle may be determined based on the traffic speed profile, the required driving torque and the current battery SOC of the vehicle, which are transferred from the driving mode data calculation unit 100. In this case, the measured value of the required driving torque requested by the driver may be converted into a power value, and then compared to the threshold of the required driving power included in the driving mode data.

According to the above-described configuration, the vehicle control apparatus may calculate the traffic speed profile indicating a representative traffic speed in a specific travel section, and optimize the driving mode of the hybrid vehicle, which is actively determined based on the calculated traffic speed profile. For example, in case of short-distance driving, the vehicle control apparatus may prevent an unnecessary entry into the HEV mode, and control the vehicle to drive only in the EV mode, thereby optimizing the fuel efficiency. Furthermore, in case of long-distance driving, the vehicle control apparatus may control the vehicle to drive in the HEV mode (CS mode) from the initial stage of driving, such that the energy efficiency is improved further than when the vehicle travels in the CD mode, and then travels in the CS mode after the battery SOC is exhausted.

Figure 4:
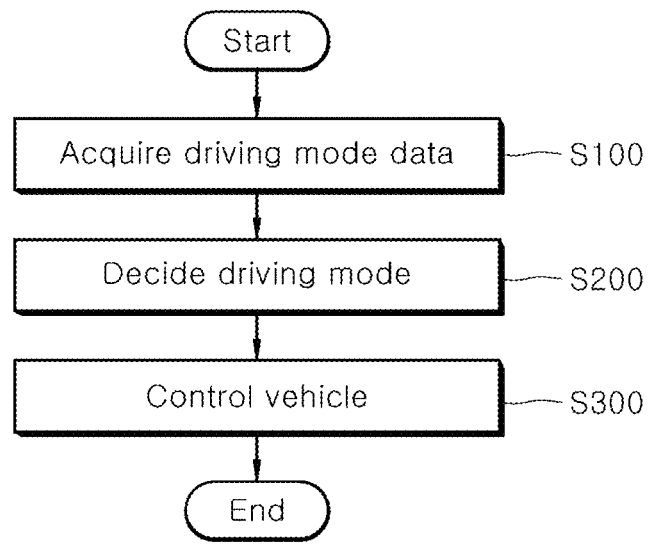

FIGS. 4 and 5 are flowcharts for describing a vehicle control method in accordance with an embodiment of the present disclosure.

Referring to FIGS. 4 and 5, the vehicle control method in accordance with the embodiment of the present disclosure starts with step S100 in which the driving control unit 200 acquires driving mode data which is calculated based on traffic information from the current position to the destination of the vehicle and the dimension information of the vehicle. As described above, the power distribution ratio of motor torque to engine torque is reflected in the driving mode data.

As illustrated in FIG. 5, the driving mode data acquired through step S100 may be acquired through step S110 of calculating a traffic speed profile as traffic information by statically analyzing the traffic speed from the current position to the destination of the vehicle, step S120 of calculating required driving torque of the vehicle, which is required for securing the traffic speed profile, by applying a predefined vehicle dynamics algorithm to the traffic speed profile calculated in step S110, step S130 of calculating a power distribution ratio capable of satisfying the required driving torque calculated in step S120, and step S140 of finally calculating the driving mode data.

In this case, as illustrated in FIG. 5, step S110 may include step S111 in which the driving mode data calculation unit 100 collects the real-time traffic speed information at the current point of time and the traffic speed history information at a past point of time corresponding to the current point of time, step S112 in which the driving mode data calculation unit 100 removes outliers as a measure of dispersion of the collected real-time traffic speed information and traffic speed history information, and step S113 in which the driving mode data calculation unit 100 calculates, as the traffic speed profile, an average value of the real-time traffic speed information and traffic speed history information from which the outliers are removed. Furthermore, step S120 may include a process in which the driving mode data calculation unit 100 calculates the required driving torque by applying the traffic speed profile and the battery SOC to the vehicle dynamics algorithm, step S130 may include a process in which the driving mode data calculation unit 100 specifies the power distribution ratio at which the fuel efficiency is maximized, among a plurality of power distribution ratios which can satisfy the required driving torque calculated in step S120, through a predefined dynamic algorithm, and step S140 may include a process in which the driving mode data calculation unit 100 calculates the driving mode data in the form of the threshold of the traffic speed profile, the threshold of the battery SOC and the threshold of the required driving power, which serve as reference values at which the driving mode of the vehicle is switched.

Then, the driving control unit 200 determines the driving mode of the vehicle by applying the travelling condition of the vehicle to the driving mode data acquired in step S100, in step S200. In step S200, the driving control unit 200 may determine the driving mode of the vehicle by applying the velocity of the vehicle, the battery SOC and the required driving torque requested by the driver, as the travelling condition of the vehicle, to the driving mode data.

Then, in step S300, the driving control unit 200 controls the vehicle to drive to the destination according to the driving mode determined in step S200.

In accordance with the present embodiment, the vehicle control method may include calculating the driving mode data into which the power distribution ratio of the motor torque of the driving motor to the engine torque of the engine is reflected, based on the traffic information to the destination, actively deciding the driving mode of the hybrid vehicle by applying the travelling condition of the vehicle to the calculated driving mode data, and controlling the vehicle according to the determined driving mode. Therefore, the driving mode of the vehicle may be optimized for the current travelling condition, which makes it possible to improve the fuel efficiency.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device or another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A control apparatus for controlling a vehicle which includes a driving motor configured to drive the vehicle by outputting motor torque based on a supply voltage from a battery, and an engine configured to drive the vehicle by outputting engine torque, the apparatus comprising:

the control apparatus configured to acquire driving mode data which is calculated based on traffic information from a current position to a destination of the vehicle and dimension information of the vehicle, and control the vehicle to drive to the destination according to a driving mode which is determined by applying a travelling condition of the vehicle to the acquired driving mode data, wherein a power distribution ratio of the motor torque to the engine torque is included in the driving mode data, wherein the control apparatus calculates a traffic speed profile as the traffic information by statistically analyzing the traffic speed from the current position to the destination of the vehicle, calculates required driving torque of the vehicle, which is required for securing the traffic speed profile, by applying a predefined vehicle dynamics algorithm to the calculated traffic speed profile, and calculates the driving mode data using a method of calculating the power distribution ratio capable of satisfying the calculated required driving torque, wherein the control apparatus collects real-time traffic speed information at a current point of time and traffic speed history information at a past point of time corresponding to the current point of time, for a route from the current position to the destination of the vehicle, removes outliers as a measure of dispersion of the collected real-time traffic speed information and traffic speed history information, and then calculates, as the traffic speed profile, an average value of the real-time traffic speed information and traffic speed history information from which the outliers are removed, and wherein the control apparatus calculates the required driving torque by applying the traffic speed profile and a battery SOC (State of Charge) to the vehicle dynamics algorithm, and calculates the driving mode data using a method of specifying the power distribution ratio at which fuel efficiency is maximized, among a plurality of power distribution ratios capable of satisfying the calculated required driving torque, through a predefined dynamic algorithm.

2. A control apparatus for controlling a vehicle which includes a driving motor configured to drive the vehicle by outputting motor torque based on a supply voltage from a battery, and an engine configured to drive the vehicle by outputting engine torque, the apparatus comprising:

a driving mode data calculation unit configured to calculate driving mode data in which a power distribution ratio of the motor torque to the engine torque is included, based on traffic information from a current position to a destination of the vehicle and dimension information of the vehicle; and a driving control unit configured to control the vehicle to drive to the destination according to a driving mode which is determined by applying a travelling condition of the vehicle to the driving mode data calculated by the driving mode data calculation unit, wherein the driving mode data calculation unit calculates a traffic speed profile as the traffic information by statistically analyzing the traffic speed from the current position to the destination of the vehicle, calculates required driving torque of the vehicle, which is required for securing the traffic speed profile, by applying a predefined vehicle dynamics algorithm to the calculated traffic speed profile, and calculates the driving mode data using a method of calculating the power distribution ratio capable of satisfying the calculated required driving torque, wherein the driving mode data calculation unit collects real-time traffic speed information at a current point of time and traffic speed history information at a past point of time corresponding to the current point of time, for a route from the current position to the destination of the vehicle, removes outliers as a measure of dispersion of the collected real-time traffic speed information and traffic speed history information, and then calculates, as the traffic speed profile, an average value of the real-time traffic speed information and traffic speed history information from which the outliers are removed, and wherein the driving mode data calculation unit calculates the required driving torque by applying the traffic speed profile and a battery SOC (State of Charge) to the vehicle dynamics algorithm, and calculates the driving mode data using a method of specifying the power distribution ratio at which fuel efficiency is maximized, among a plurality of power distribution ratios capable of satisfying the calculated required driving torque, through a predefined dynamic algorithm.

3. The control apparatus of claim 2, wherein the vehicle dynamics algorithm is an algorithm based on a longitudinal vehicle dynamics backward model, and the dynamic algorithm is an algorithm based on dynamic programming.

4. The control apparatus of claim 2, wherein the driving mode data is calculated as a threshold of the traffic speed profile, a threshold of the battery SOC, and a threshold of the required driving power, which serve as reference values at which the driving mode of the vehicle is switched.

5. The control apparatus of claim 4, wherein the driving control unit controls the vehicle according to the driving mode which is determined by applying the velocity of the vehicle, the battery SOC, and required driving torque requested by a driver, as the travelling condition of the vehicle, to the driving mode data.

6. The control apparatus of claim 1, wherein the vehicle is a plug-in hybrid vehicle, wherein the driving mode of the vehicle comprises an electric vehicle (EV) mode in which only the driving motor is driven and a hybrid electric vehicle (HEV) mode in which the driving motor and the engine are simultaneously driven.

7. A method for controlling a vehicle which includes a driving motor configured to drive the vehicle by outputting motor torque based on a supply voltage from a battery, and an engine configured to drive the vehicle by outputting engine torque, the method comprising:

acquiring, by a driving control unit, driving mode data which is calculated based on traffic information from a current position to a destination of the vehicle and dimension information of the vehicle, wherein a power distribution ratio of the motor torque to the engine torque is reflected in the driving mode data;

deciding, by the driving control unit, a driving mode of the vehicle by applying a travelling condition of the vehicle to the acquired driving mode data; and controlling, by the driving control unit, the vehicle to be driven to the destination according to the determined driving mode, wherein the driving mode data is calculated through the following steps:

calculating a traffic speed profile as the traffic information by statistically analyzing the traffic speed from the current position to the destination of the vehicle;

calculating required driving torque of the vehicle, which is required for securing the traffic speed profile, by applying a predefined vehicle dynamics algorithm to the calculated traffic speed profile; and calculating the power distribution ratio capable of satisfying the calculated required driving torque, wherein calculating the traffic speed profile comprises:

collecting real-time traffic speed information at a current point of time and traffic speed history information at a past point of time corresponding to the current point of time, for a route from the current position to the destination of the vehicle;

removing outliers as a measure of dispersion of the collected real-time traffic speed information and traffic speed history information; and calculating an average value of the real-time traffic speed information and traffic speed history information, from which the outliers are removed, as the traffic speed profile, wherein in calculating the required driving torque of the vehicle, the required driving torque is calculated by applying the traffic speed profile and a battery SOC to the vehicle dynamics algorithm, and wherein in calculating the power distribution ratio, the power distribution ratio is calculated using a method of specifying the power distribution ratio at which fuel efficiency is maximized, among a plurality of power distribution ratios capable of satisfying the calculated required driving torque, through a predefined dynamic algorithm.

8. The method of claim 7, wherein the vehicle dynamics algorithm is an algorithm based on a longitudinal vehicle dynamics backward model, and the dynamic algorithm is an algorithm based on dynamic programming.

9. The method of claim 7, wherein the driving mode data is calculated as a threshold of the traffic speed profile, a threshold of the battery SOC, and a threshold of the required driving power, which serve as reference values at which the driving mode of the vehicle is switched.

10. The method of claim 9, wherein in deciding the driving mode of the vehicle, the driving control unit determines the driving mode by applying a velocity of the vehicle, the battery SOC, and required driving torque requested by a driver, as the travelling condition of the vehicle, to the driving mode data.

11. The method of claim 7, wherein the vehicle is a plug-in hybrid vehicle, wherein the driving mode of the vehicle comprises an electric vehicle (EV) mode in which only the driving motor is driven and a hybrid electric vehicle (HEV) mode in which the driving motor and the engine are simultaneously driven.

\* \* \* \* \*